US008447275B2

(12) United States Patent
Dearborn

(10) Patent No.: US 8,447,275 B2
(45) Date of Patent: May 21, 2013

(54) LOSSLESS INDUCTOR CURRENT SENSING IN A SWITCH-MODE POWER SUPPLY

(75) Inventor: Scott Dearborn, Brackney, PA (US)

(73) Assignee: Microchip Technology Incorporated, Chandler, AZ (US)

( * ) Notice: Subject to any disclaimer, the term of this patent is extended or adjusted under 35 U.S.C. 154(b) by 354 days.

(21) Appl. No.: 12/959,837

(22) Filed: Dec. 3, 2010

(65) Prior Publication Data

US 2012/0139519 A1   Jun. 7, 2012

(51) Int. Cl.
G06F 15/16 (2006.01)

(52) U.S. Cl.
USPC ............................. 455/413; 323/282; 327/557

(58) Field of Classification Search
USPC ................. 323/222, 235, 241, 244, 246, 319, 323/322, 282–288; 363/85, 87, 88, 127, 128, 363/129; 455/207, 209, 255–260, 314, 315, 455/265, 164.2, 413; 327/50, 57, 155, 156, 327/159, 540, 553; 324/525, 710, 754–765; 330/166, 177, 159; 331/182–186
See application file for complete search history.

(56) References Cited

U.S. PATENT DOCUMENTS

| | | | |
|---|---|---|---|
| 5,319,536 A * | 6/1994 | Malik | 363/65 |
| 6,580,258 B2 * | 6/2003 | Wilcox et al. | 323/282 |
| 6,642,696 B2 * | 11/2003 | Tateishi | 323/222 |
| 7,904,035 B2 * | 3/2011 | Kasha et al. | 455/115.2 |
| 8,295,798 B2 * | 10/2012 | Wang et al. | 455/266 |
| 2009/0267582 A1 | 10/2009 | Prodic et al. | 323/283 |

FOREIGN PATENT DOCUMENTS

| | | |
|---|---|---|
| DE | 4422399 A1 | 1/1996 |
| EP | 1087509 A2 | 3/2001 |

OTHER PUBLICATIONS

Forghani-Zadeh, H., et al., "Current-Sensing Techniques for DC-DC Converters", Midwest Symposium on Circuits and Systems, Conference Proceedings, vol. 2: pp. 577-580, Aug. 4, 2002.
Forghani-Zadeh, H., "A Lossless Accurate, Self-Calibrating Current-Sensing Technique for DC-DC Converters", Industrial Electronics Society, 31$^{st}$ Annual Conference of IEEE; pp. 549-554, Nov. 6, 2005.
International PCT Search Report and Written Opinion, PCT/US2011/062792, 13 pages, Oct. 9, 2012.

* cited by examiner

*Primary Examiner* — Rajnikant Patel
(74) *Attorney, Agent, or Firm* — King & Spalding L.L.P.

(57) ABSTRACT

A lossless inductor current sense technique integrates a matched, tunable complimentary filter with a switch mode power supply (SMPS) controller for accurately measuring current through the power inductor of the SMPS without introducing losses in the power circuit. The complimentary filter can be adjusted in-circuit to significantly reduce the effects of component tolerances, accurately measuring the power inductor current for over current protection and/or closed loop control. The frequency pole and gain of the complimentary integrated filter can be adjusted on the fly in order to adapt to dynamically changing operating conditions of the SMPS system.

30 Claims, 9 Drawing Sheets

FIGURE 1 (Prior Technology)

FIGURE 2 (Prior Technology)

FIGURE 3 (Prior Technology)

FIGURE 4 (Prior Technology)

FIGURE 5 (Prior Technology)

LOSSLESS INDUCTOR CURRENT SENSING IN A SWITCH-MODE POWER SUPPLY

TECHNICAL FIELD

The present disclosure relates to switch mode power supplies, and, more particularly, to lossless inductor current sensing in a switch-mode power supply (SMPS) by utilizing a matching complimentary tunable filter.

BACKGROUND

The synchronous buck switch-mode power converter is a commonly used topology for SMPS applications. Current sensing in this topology can be challenging and must be overcome in design. Knowing or monitoring the current being injected into the load provides protection for the power converter and can improve dynamic performance during closed loop control thereof.

Some prior technology current sensing techniques are as follows: Series sense resistor in main power path, current sense transformer, sensing voltage drop across the upper MOSFET switch, and an inductor voltage integral measurement by using an auxiliary winding to the power inductor 108. Referring now to FIG. 1, depicted is a prior technology SMPS having a series sense resistor 110 in the main power path. A voltage across the series sense resistor 110 is detected by a differential input operational amplifier 114 and a $V_{SENSE}$ output therefrom is proportional to the load current being supplied by the SMPS. However, the series sense resistor 110 introduces undesirable power loss. Since high efficiency is usually an overriding requirement in most SMPS applications, resistive circuit elements in the power path should be avoided or minimized. Only on rare occasions and for very specific reasons are power consuming resistances introduced into the main power control path. In auxiliary circuits, such as sequence, monitor, and control electronics of total system, high value resistors are common place, since their loss contributions are usually insignificant.

Referring to FIG. 2, depicted is a prior technology SMPS having a current sense transformer for measuring current to the load. A current sense transformer 214 has a primary connected in series with the power path of the SMPS. A sense diode 216 and sense resistor 218 provide a $V_{SENSE}$ output proportional to the load current being supplied by the SMPS. The current sense transformer 214 provides current monitoring for cycle-by-cycle peak current limit and peak current mode control. Power loss is minimal for this current monitoring configuration, however, implementation is expensive.

Referring to FIG. 3, depicted is a prior technology SMPS with monitoring of the on-voltage drop across the upper MOSFET switch 104. Sensing the voltage drop across the upper MOSFET switch 104 when the switch 104 is on provides a lossless signal representative of the current passing through it. A differential input operational amplifier 314 senses the voltage across the MOSFET switch 104 and produces a sense voltage output, $V_{SENSE}$. However, this voltage drop is an inaccurate representation of the load current and is further subject to inaccuracies due to a high temperature coefficient of the MOSFET $R_{DS-ON}$.

Referring to FIG. 4, depicted is a prior technology SMPS having an inductor voltage integral measurement by using an auxiliary winding to the power inductor. By adding an auxiliary winding 416 to the power inductor 108, a substantially lossless signal, $V_{SENSE}$, representative of the current passing through the power inductor 108 is provided. However, the requirement for a coupled inductor increases the cost of the magnetic components of the SMPS.

Referring to FIG. 5, depicted is a prior technology SMPS having a matching complimentary filter for measuring current through the SMPS inductor. This matching complimentary filter is utilized in combination with the inductor coil resistance, $R_L$, of the power inductor 108 to sense the current therethrough. The matching complimentary filter consists of a resistor 520, $R_F$, in series with a small value capacitor 522, $C_F$. This series connected combination is connected in parallel with the inductor 108. When the complimentary filter impedance is matched to the impedance of the power inductor 108, i.e., $L/R_L = R_F \cdot C_F$, the capacitor voltage, $V_{CF}$, is directly proportional to the current through the inductor 108. This is readily shown from the following equations:

$$V_L = I_L \cdot (R_L + s \cdot L)$$

$$V_L = I_L \cdot R_L \cdot (1 + s \cdot (L/R_L))$$

$$V_{CF} = V_L / (1 + s \cdot R_F \cdot C_F)$$

$$V_{CF} = I_L \cdot R_L \cdot [(1 + s \cdot (L/R_L))/(1 + s \cdot R_F \cdot C_F)]$$

if $L/R_L = R_F \cdot C_F$, then $V_{CF} = I_L \cdot R_L$

Where $V_L$ is the voltage across the inductor 108, L is the inductance in henrys of the inductor 108, $R_L$ is the coil resistance in ohms of the inductor 108, $I_L$ is the current in amperes through the inductor 108, and s is the complex frequency in the s-domain (i.e., frequency-domain). Where $V_{CF}$ is the voltage across the matching complimentary filter capacitor 522, $C_F$ is the capacitance in farads of the capacitor 522, and $R_F$ is the resistance in ohms of the matching complimentary filter resistor 520.

The voltage, $V_{CF}$, across the capacitor 522, $C_F$, is applied to the inputs of a differential amplifier 514 and a $V_{SENSE}$ output therefrom is proportional to the load current, $I_L$, being supplied by the SMPS. Measurement of current through the inductor 108 is lossless since no resistor or impedance has been introduced into the high current path of the SMPS. However, this complimentary filter must be matched to the equivalent inductance, L, and series resistance, $R_L$, of the inductor 108 for accurate and absolute current measurement results. This circuit also suffers from a high temperature coefficient due to the discrete component value changes over an operating temperature range, thereby reducing accuracy over the range of operating conditions of the SMPS.

SUMMARY

What is needed is a system, method and apparatus for accurately measuring current through a SMPS power inductor that does not waste power, is highly accurate over all operating conditions, and is flexible and low in cost to implement in a mixed signal integrated circuit.

According to a specific example embodiment of this disclosure, a tunable complimentary filter for measuring current through an inductor in a switch-mode power supply (SMPS) comprises: an operational transconductance amplifier (OTA) having a first input coupled to a voltage source side of an inductor in a switch-mode power supply (SMPS), a second input coupled to a load side of the inductor and a current output; an operational amplifier configured as a buffer amplifier and having an input coupled to the current output of the OTA; a first adjustable resistor coupled between the current output of the OTA and a return of the voltage source; a second adjustable resistor having a first end coupled to an output of the operational amplifier; and a tuning capacitor coupled between a second end of the second adjustable resistor and the return of the voltage source; a voltage from the tunable complimentary filter is available at the second end of the second adjustable resistor, wherein the voltage is representative of the current flowing through the inductor of the SMPS.

According to another specific example embodiment of this disclosure, a tunable complimentary filter for measuring current through an inductor in a switch-mode power supply (SMPS) comprises: an operational transconductance amplifier (OTA) having a first input coupled to a voltage source side of an inductor in a switch-mode power supply (SMPS), a second input coupled to a load side of the inductor and a current output; an adjustable resistor coupled between the current output of the OTA and a return of the voltage source; and a tuning capacitor coupled between the current output of the OTA and the return of the voltage source; a voltage from the tunable complimentary filter is available at the current output of the OTA, wherein the voltage is representative of the current flowing through the inductor of the SMPS.

According to still another specific example embodiment of this disclosure, a system for controlling a switch-mode power supply (SMPS) comprises: a power inductor; high and low switching power transistors coupled between the power inductor and positive and negative nodes of a voltage source, respectively; a filter capacitor coupled to the power inductor and the negative node of the voltage source; a tunable complimentary filter coupled to the power inductor, wherein the tunable complimentary filter measures current through the power inductor by providing a voltage output from the tunable complimentary filter representative of the current flowing through the power inductor; a SMPS controller having driver outputs coupled to the high and low switching transistors, a first input coupled to the filter capacitor for measuring a regulated output voltage from the SMPS and a second input coupled to the voltage output of the tunable complimentary filter, wherein the SMPS controller uses the regulated output voltage coupled to the first input and the voltage output from the tunable complimentary filter representative of the current flowing through the inductor as SMPS control parameters.

BRIEF DESCRIPTION OF THE DRAWINGS

A more complete understanding of the present disclosure thereof may be acquired by referring to the following description taken in conjunction with the accompanying drawings wherein.

Figure 1:
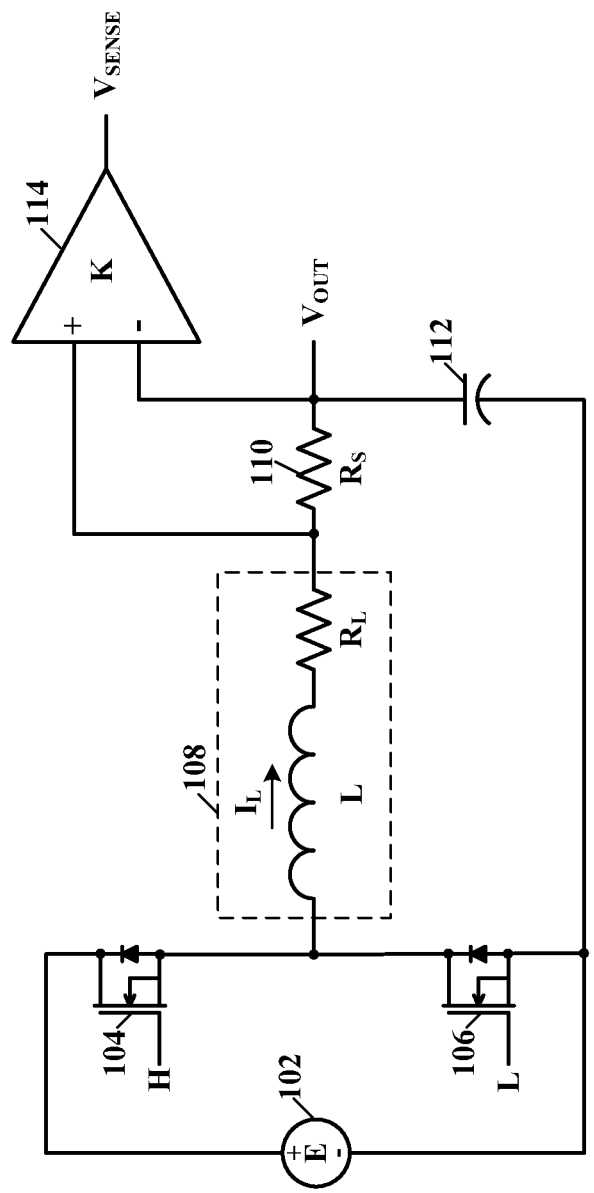
FIG. 1 illustrates a schematic diagram of a prior technology SMPS having a series sense resistor in the main power path.
Figure 2:
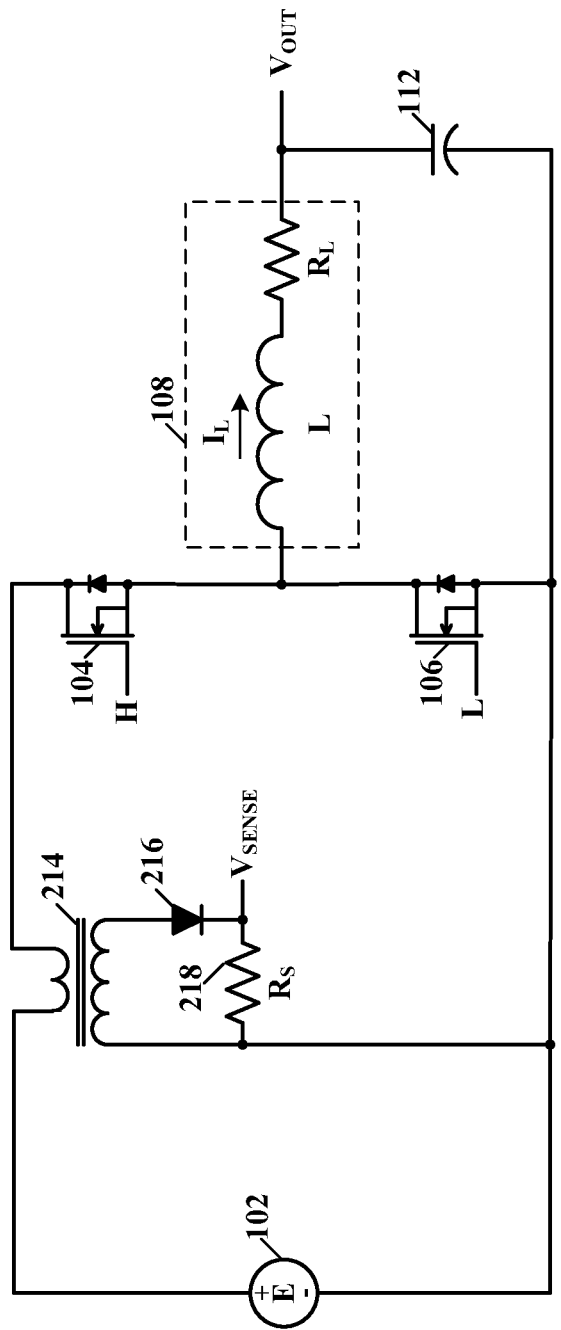
FIG. 2 illustrates a schematic diagram of a prior technology SMPS having a current sense transformer for measuring current to the load.
Figure 3:
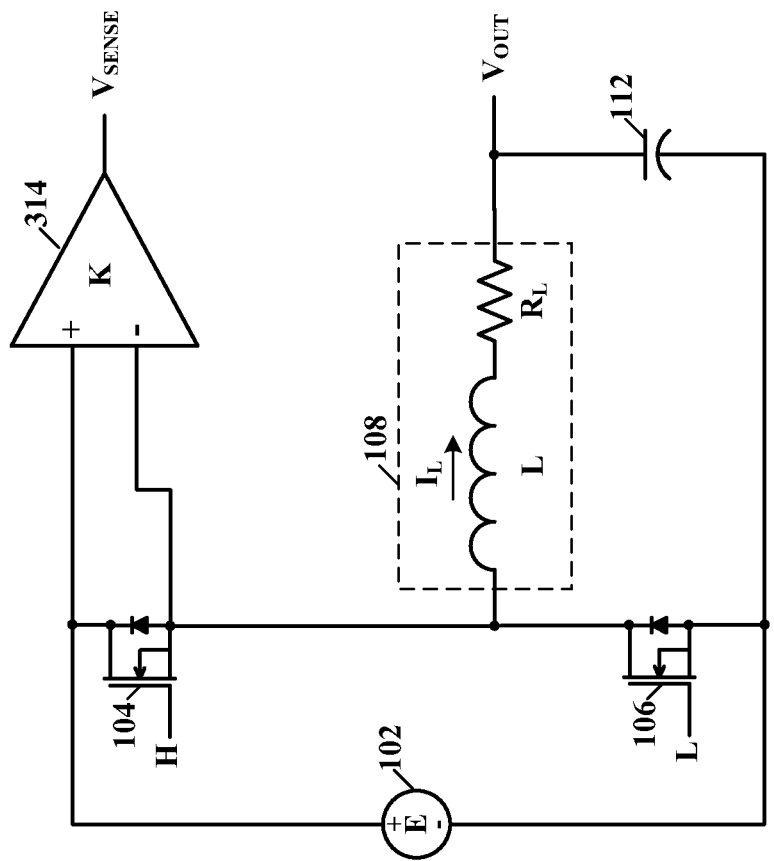
FIG. 3 illustrates a schematic diagram of a prior technology SMPS with monitoring of the on-voltage drop across the upper MOSFET switch.
Figure 4:
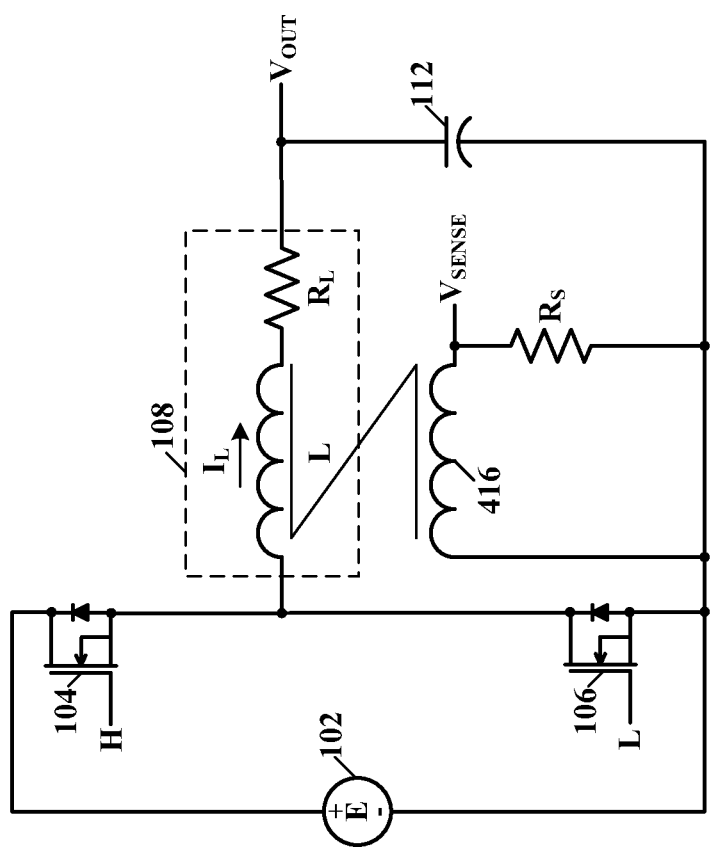
FIG. 4 illustrates a schematic diagram of a prior technology SMPS having an inductor voltage integral measurement by using an auxiliary winding to the power inductor.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Figure 5:
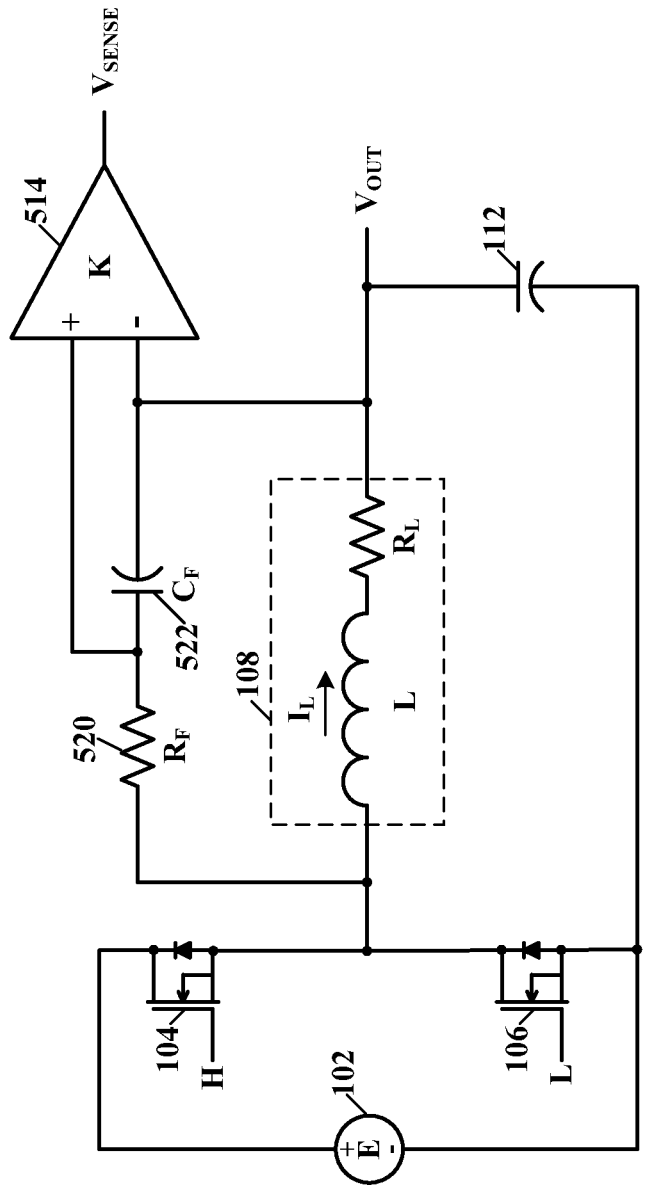
FIG. 5 illustrates a schematic diagram of a prior technology SMPS having a matching complimentary filter for measuring current through the SMPS inductor.
Figure 6:
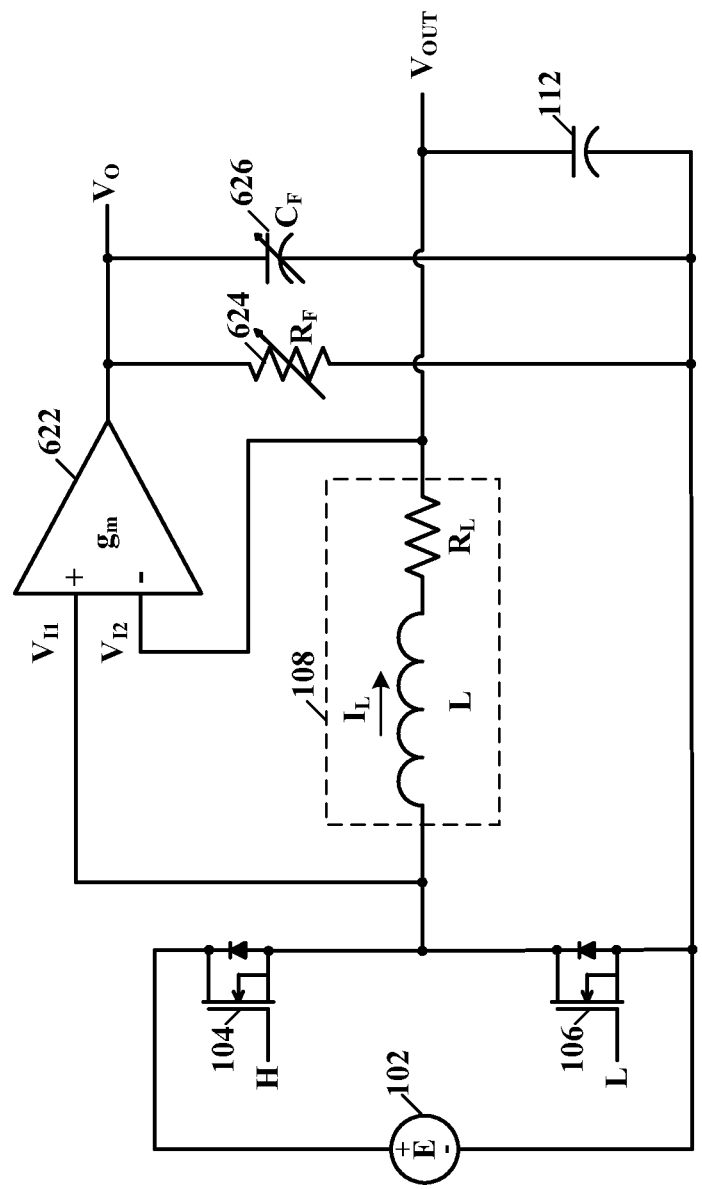
FIG. 6 illustrates a schematic diagram of a circuit for losslessly measuring inductor current of a SMPS, according to a specific example embodiment of this disclosure.
Figure 7:
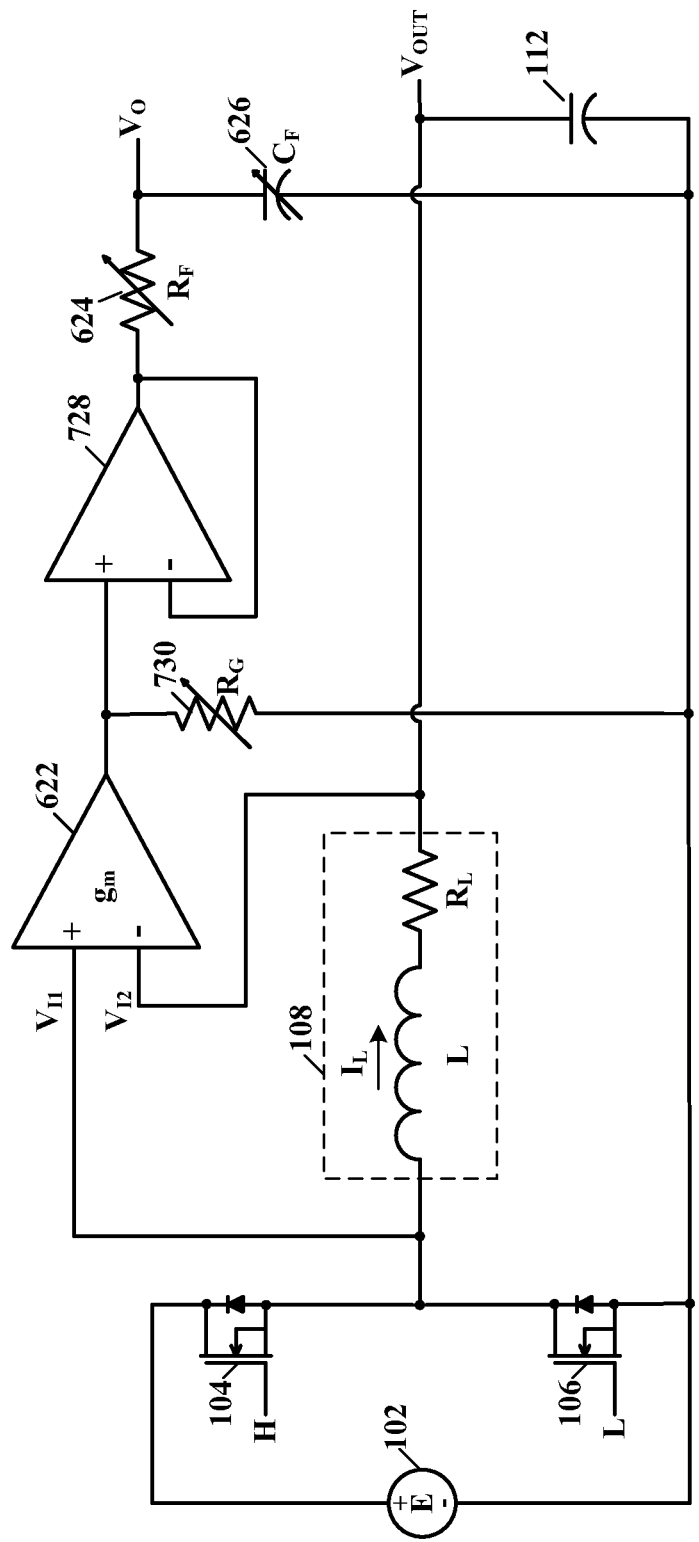
FIG. 7 illustrates a schematic diagram of a circuit for losslessly measuring inductor current of a SMPS, according to another specific example embodiment of this disclosure.

The matched filter shown in FIG. 5 is a basis for the new, novel and non-obvious system, method and apparatus for losslessly measuring SMPS power inductor current, according to the teachings of this disclosure. A matched complimentary filter is integrated into an SMPS controller by utilizing a tunable filter comprising an operational transconductance amplifier (OTA), a variable resistor and a variable capacitor in one specific example embodiment (FIG. 6). In another specific example embodiment, an operational amplifier, configured as a buffer, and a variable resistor have been added, providing independent gain and pole location adjustment (FIG. 7).

Referring to FIG. 6, depicted is a schematic diagram of a circuit for losslessly measuring inductor current of a SMPS, according to a specific example embodiment of this disclosure. A tunable complimentary filter inductor current measuring circuit comprises an operational transconductance amplifier (OTA) 622, a variable resistor 624, and a variable capacitor 626. The OTA 622 is configured as a voltage variable integrator and is used as a first-order low-pass filter (see FIGS. 8 and 9). The transfer function for this integrator is:

$$V_O/(V_{I1}-V_{I2}) = g_m/(s*C_F)$$

The OTA 622 circuit shown in FIG. 6 has an adjustable pole frequency, and adjustable DC gain. The pole frequency is adjusted by the capacitor 626, $C_F$, and resistor 624, $R_F$; and the DC gain is adjusted by the resistor 624, $R_F$. The transfer function of the filter shown in FIG. 6 is represented by:

$$V_O/(V_{I1}-V_{I2}) = (g_m*R_F)/(s*R_F*C_F+1)$$

As noted from the transfer function, the DC gain is equal to $g_m*R_F$; and the pole frequency is equal to $1/(2\pi*R_F*C_F)$ Hz. The pole frequency and DC gain can not be adjusted independently.

Referring to FIG. 7, depicted is a schematic diagram of a circuit for losslessly measuring inductor current of a SMPS, according to another specific example embodiment of this disclosure. A tunable complimentary filter inductor current measuring circuit comprises an operational transconductance amplifier (OTA) 622, a variable resistor 624, an operational amplifier 728 configured as a buffer, a variable resistor 730, and a variable capacitor 626. The OTA 622 is configured as a voltage variable input gain stage with a wide bandwidth. The operational amplifier 728 decouples the input gain stage from the single pole, low pass filter. The pole frequency can be adjusted by changing the resistor 624, $R_F$, and/or the capacitor 626, $C_F$, and the DC gain can be subsequently adjusted by changing the variable resistor 730, $R_G$. The transfer function of the filter shown in FIG. 7 is represented by:

$$V_O/(V_{I1}-V_{I2})=(g_m*R_G)/(s*R_F*C_F+1)$$

As noted from the transfer function, the DC gain is equal to $g_m*R_G$; and the pole frequency is equal to $1/(2\pi*R_F*C_F)$ Hz. The pole frequency and DC gain can be adjusted independently.

The tunable complimentary filters shown in FIGS. 6 and 7 can be adjusted, e.g., tuned, to match the L/RL zero pole, and gain adjusted to amplify the sensed current signal to a desired voltage level. The tunable complimentary filters can further be adjusted in-circuit to significantly reduce the effects of component tolerances. The tunable complimentary filters can be adjusted on the fly in order to adapt to changing operating conditions of the SMPS. The tunable complimentary filters accurately measure the inductor 108 current for over current protection and/or closed loop control of the SMPS.

Figures 8, 9:
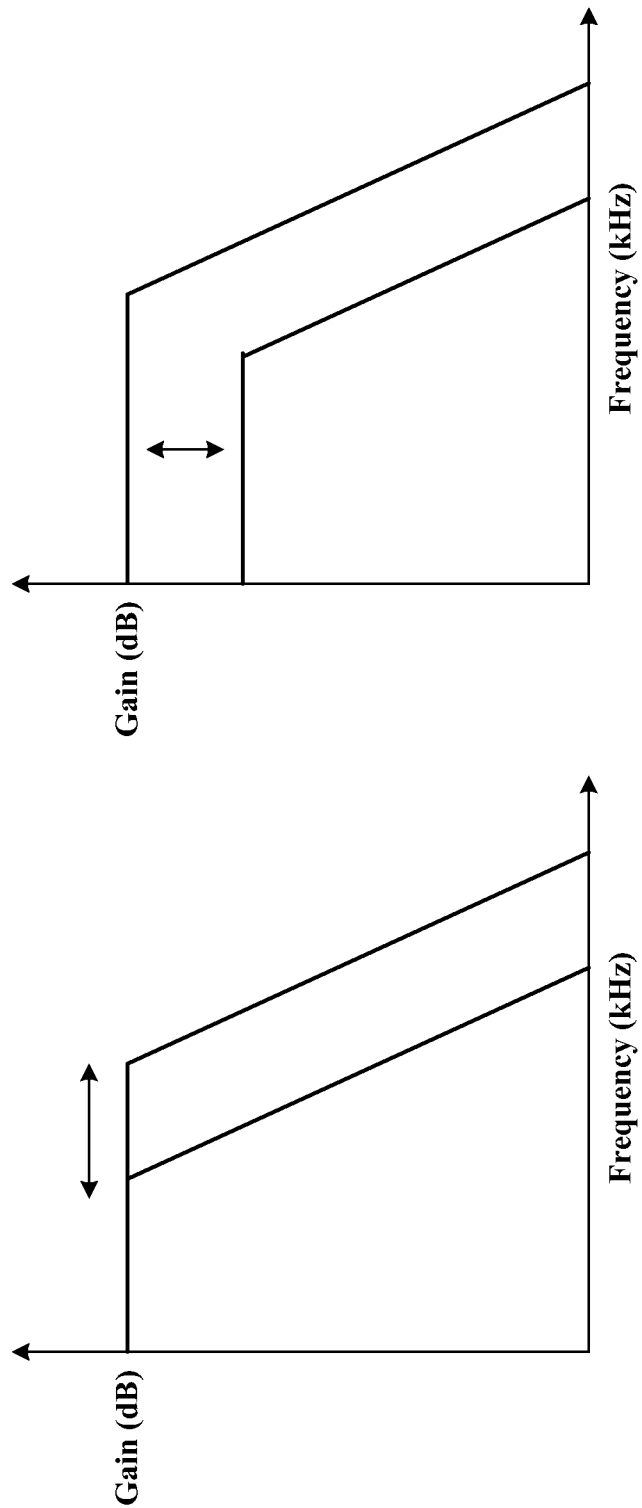
FIG. 8 illustrates a graph of pole frequency adjustments for the circuits shown in FIGS. 6 and 7.
FIG. 9 illustrates a graph of DC gain adjustments for the circuits shown in FIGS. 6 and 7.

Referring to FIG. 8, depicted is a graph of pole frequency adjustments for the circuits shown in FIGS. 6 and 7.

Referring to FIG. 9, depicted is a graph of DC gain adjustments for the circuits shown in FIGS. 6 and 7.

Figure 10:
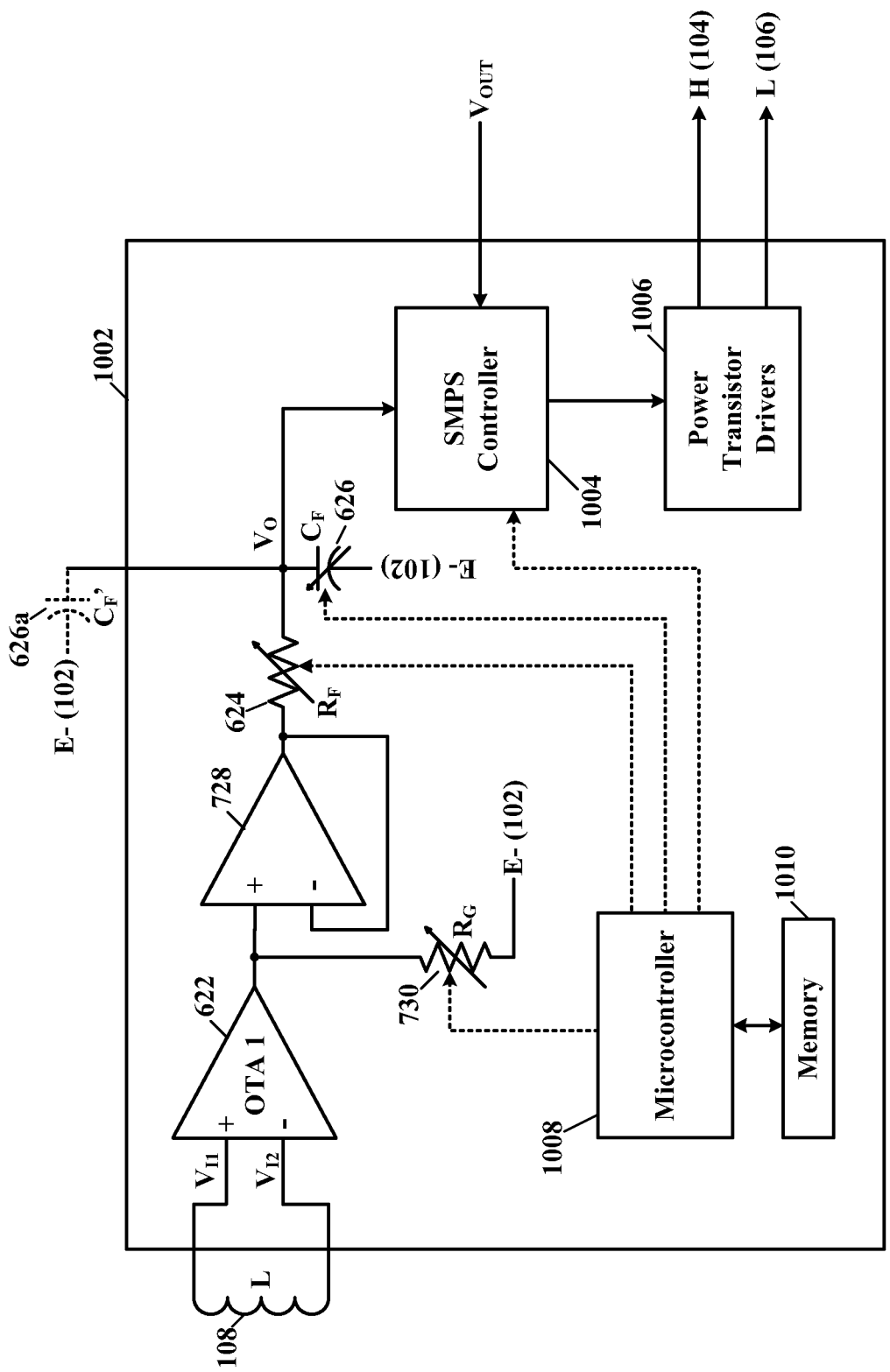
FIG. 10 illustrates a schematic block diagram of a mixed signal integrated circuit device for controlling a SMPS system using the specific example embodiments of the tunable complimentary filters shown in FIGS. 6 and 7.

Referring to FIG. 10, depicted is a schematic block diagram of a mixed signal integrated circuit device for controlling a SMPS system using the specific example embodiments of the tunable complimentary filters shown in FIGS. 6 and 7. The mixed signal integrated circuit device 1002 comprises a SMPS controller 1004, power transistor drivers 1006, a microcontroller 1008 and associated memory 1010, an OTA 622, an operational amplifier 728, a DC gain setting resistor 730, a pole frequency setting resistor 624, and a pole frequency setting capacitor 626. The SMPS controller 1004 may generate a pulse width modulation (PWM), pulse frequency modulation (PFM), pulse density modulation (PDM), etc., signal for controlling the power transistor drivers 1006 that provide the power control signals to the power MOSFET switches 104 and 106 of the SMPS. The SMPS controller 1004 monitors the voltage regulated output voltage, $V_{OUT}$, and the measured inductor current signal, $V_O$, from the tunable complimentary filter comprising OTA 622, operational amplifier 728, variable resistors 624 and 730, and tuning capacitor 626.

The OTA 622, operational amplifier 728, variable resistors 624 and 730, and tuning capacitor 626 are connected and operate as more fully described hereinabove. The microcontroller 1008 controls the variable resistors 624 and 730, as well as setting parameters for the SMPS controller 1004 (dotted lines represent control signals). It is contemplated and within the scope of this disclosure that the microcontroller 1008 can perform the same functions as and replace the SMPS controller 1004. The microcontroller 1008 has analog inputs and analog-to-digital conversion circuits (not shown). An operating program for the mixed signal integrated circuit device 1002 may be stored in the memory 1010 associated with the microcontroller 1008. An additional capacitor 626a may be added external to the mixed signal integrated circuit device 1002 and in parallel with the internal capacitor 626. The microcontroller 1008 may control the capacitance value of the capacitor 626, and in combination with control of the variable resistors 624 and 730. Control of the capacitor 626 and/or variable resistors 624 and 730 by the microcontroller 1008 allows dynamic tuning of the gain and/or pole frequency of the tunable complementary filter complimentary filter on the fly for optimal current measurement under changing operating conditions of the SMPS. The tunable complimentary filter implementation(s), according to the teachings of this disclosure can also be applied, but is not limited to, switch-mode power converters, (SMPC), brushless dc motors, etc.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A tunable complimentary filter for measuring current through an inductor in a switch-mode power supply (SMPS), comprising:
   an operational transconductance amplifier (OTA) having a first input coupled to a voltage source side of an inductor in a switch-mode power supply (SMPS), a second input coupled to a load side of the inductor and a current output;
   an operational amplifier configured as a buffer amplifier and having an input coupled to the current output of the OTA;
   a first adjustable resistor coupled between the current output of the OTA and a return of the voltage source;
   a second adjustable resistor having a first end coupled to an output of the operational amplifier; and
   a tuning capacitor coupled between a second end of the second adjustable resistor and the return of the voltage source;
   a voltage from the tunable complimentary filter is available at the second end of the second adjustable resistor, wherein the voltage is representative of the current flowing through the inductor of the SMPS.

2. The tunable complimentary filter according to claim 1, wherein the OTA, operational amplifier, first and second adjustable resistors and tuning capacitor comprise a first-order low-pass filter.

3. The tunable complimentary filter according to claim 1, wherein the OTA is configured as a voltage variable input gain stage with a wide frequency bandwidth.

4. The tunable complimentary filter according to claim 1, wherein a pole frequency of the tunable complimentary filter is adjusted by changing a resistance of the second adjustable resistor.

5. The tunable complimentary filter according to claim 1, wherein a pole frequency of the tunable complimentary filter is adjusted to match the zero frequency of the inductor by changing a resistance of the second adjustable resistor.

6. The tunable complimentary filter according to claim 1, wherein a pole frequency of the tunable complimentary filter is adjusted by changing a capacitance of the tuning capacitor.

7. The tunable complimentary filter according to claim 1, wherein a pole frequency of the tunable complimentary filter is adjusted to match the inductor zero frequency by changing a capacitance of the tuning capacitor.

8. The tunable complimentary filter according to claim 1, wherein gain of the tunable complimentary filter is adjusted by changing a resistance of the first adjustable resistor.

9. The tunable complimentary filter according to claim 1, wherein a pole frequency of the tunable complimentary filter is adjusted while measuring current through the inductor.

10. The tunable complimentary filter according to claim 1, wherein the OTA, the operational amplifier, the first and second adjustable resistors and tuning capacitor are fabricated on a semiconductor die of a mixed signal integrated circuit.

11. The tunable complimentary filter according to claim 10, further comprising a microcontroller fabricated on the integrated circuit die, wherein the microcontroller controls resistances of the first and second adjustable resistors, and a capacitance of the tuning capacitor.

12. The tunable complimentary filter according to claim 10, further comprising a switch-mode power supply controller, and high and low power transistor drivers fabricated on the semiconductor die.

13. The tunable complimentary filter according to claim 10, further comprising an external tuning capacitor coupled to the tuning capacitor fabricated on the semiconductor die.

14. A tunable complimentary filter for measuring current through an inductor in a switch-mode power supply (SMPS), comprising:
an operational transconductance amplifier (OTA) having a first input coupled to a voltage source side of an inductor in a switch-mode power supply (SMPS), a second input coupled to a load side of the inductor and a current output;
an adjustable resistor coupled between the current output of the OTA and a return of the voltage source; and
a tuning capacitor coupled between the current output of the OTA and the return of the voltage source;
a voltage from the tunable complimentary filter is available at the current output of the OTA, wherein the voltage is representative of the current flowing through the inductor of the SMPS.

15. The tunable complimentary filter according to claim 14, wherein the OTA is configured as a voltage variable integrator and functions as a first-order low-pass filter.

16. The tunable complimentary filter according to claim 14, wherein a pole frequency of the tunable complimentary filter is adjusted by changing a resistance of the adjustable resistor.

17. The tunable complimentary filter according to claim 14, wherein a pole frequency of the tunable complimentary filter is adjusted to match the zero frequency of the inductor by changing a resistance of the adjustable resistor.

18. The tunable complimentary filter according to claim 14, wherein a pole frequency of the tunable complimentary filter is adjusted by changing a capacitance of the tuning capacitor.

19. The tunable complimentary filter according to claim 14, wherein a pole frequency of the tunable complimentary filter is adjusted to match the inductor zero frequency by changing a capacitance of the tuning capacitor.

20. The tunable complimentary filter according to claim 14, wherein gain of the tunable complimentary filter is adjusted by changing a resistance of the adjustable resistor.

21. The tunable complimentary filter according to claim 14, wherein a pole frequency of the tunable complimentary filter is adjusted while measuring current through the inductor.

22. The tunable complimentary filter according to claim 14, wherein the OTA the adjustable resistor and tuning capacitor are fabricated on an integrated circuit die of a mixed signal integrated circuit.

23. The tunable complimentary filter according to claim 22, further comprising a microcontroller fabricated on the integrated circuit die, wherein the microcontroller controls a resistance of the adjustable resistor and a capacitance of the tuning capacitor.

24. The tunable complimentary filter according to claim 22, further comprising a switch-mode power supply controller, and high and low power transistor drivers fabricated on the semiconductor die.

25. The tunable complimentary filter according to claim 22, further comprising an external tuning capacitor coupled to the tuning capacitor fabricated on the semiconductor die.

26. A system for controlling a switch-mode power supply (SMPS), said system comprising:
a power inductor;
high and low switching power transistors coupled between the power inductor and positive and negative nodes of a voltage source, respectively;
a filter capacitor coupled to the power inductor and the negative node of the voltage source;
a tunable complimentary filter coupled to the power inductor, wherein the tunable complimentary filter measures current through the power inductor by providing a voltage output from the tunable complimentary filter representative of the current flowing through the power inductor;
a SMPS controller having driver outputs coupled to the high and low switching transistors, a first input coupled to the filter capacitor for measuring a regulated output voltage from the SMPS and a second input coupled to the voltage output of the tunable complimentary filter, wherein the SMPS controller uses the regulated output voltage coupled to the first input and the voltage output from the tunable complimentary filter representative of the current flowing through the inductor as SMPS control parameters.

27. The system according to claim 26, wherein the tunable complimentary filter, comprises:
an operational transconductance amplifier (OTA) having a first input coupled to a voltage source side of an inductor in the SMPS, a second input coupled to a load side of the inductor and a current output;
an operational amplifier configured as a buffer amplifier and having an input coupled to the current output of the OTA;
a first adjustable resistor coupled between the current output of the OTA and a return of the voltage source;
a second adjustable resistor having a first end coupled to an output of the operational amplifier; and
a tuning capacitor coupled between a second end of the second adjustable resistor and the return of the voltage source;
a voltage from the tunable complimentary filter is available at the second end of the second adjustable resistor, wherein the voltage is representative of the current flowing through the inductor of the SMPS.

28. The system according to claim 26, wherein the tunable complimentary filter, comprises:
an operational transconductance amplifier (OTA) having a first input coupled to a voltage source side of an inductor in the SMPS, a second input coupled to a load side of the inductor and a current output;
an adjustable resistor coupled between the current output of the OTA and a return of the voltage source; and
a tuning capacitor coupled between the current output of the OTA and the return of the voltage source;

a voltage from the tunable complimentary filter is available at the current output of the OTA, wherein the voltage is representative of the current flowing through the inductor of the SMPS.

29. The system according to claim 27, further comprising an integrated circuit die having the tunable complimentary filter and the SMPS controller fabricated on an integrated circuit die of a mixed signal integrated circuit.

30. The system according to claim 29, further comprising a microcontroller fabricated on the integrated circuit die, wherein the microcontroller controls the tunable complimentary filter and the SMPS controller.

* * * * *